United States Patent [19]
Nagel

[11] 3,883,733
[45] May 13, 1975

[54] OPTICAL CONSTRUCTION OF A LENS

[75] Inventor: Robert I. Nagel, Skokie, Ill.

[73] Assignee: John Voevodsky, Portola Valley, Calif.

[22] Filed: Mar. 18, 1974

[21] Appl. No.: 451,767

[52] U.S. Cl. ............... 240/106.1; 240/8.3; 350/167
[51] Int. Cl. ............................................. F21v 5/04
[58] Field of Search ................. 240/106, 106.1, 8.3; 350/167

[56] References Cited
UNITED STATES PATENTS

| | | | |
|---|---|---|---|
| 2,542,114 | 2/1951 | Bridge | 240/106.1 |
| 2,831,394 | 4/1958 | Heenan et al. | 240/106.1 |
| 3,119,894 | 1/1964 | Nagel et al. | 240/106.1 |
| 3,235,720 | 2/1966 | Bridge | 240/8.3 |
| 3,622,231 | 11/1971 | Hangan | 240/106.1 |

Primary Examiner—Joseph F. Peters, Jr.
Attorney, Agent, or Firm—Flehr, Hohbach, Test, Albritton & Herbert

[57] ABSTRACT

A lens for directing light from a light source along an extension of the lens centerline. The lens may have any desired color and is in the form of a section of a thin spherical shell. The convex side of the shell is covered by a plurality of coterminous aspherical convex lenses and the concave side is covered by a series of concentric triangular lenses having configurations described by reference to Table I. The lens configuration provides for a reduction in light intensity transmission along lines of angular departure from the extension of the lens centerline.

4 Claims, 7 Drawing Figures

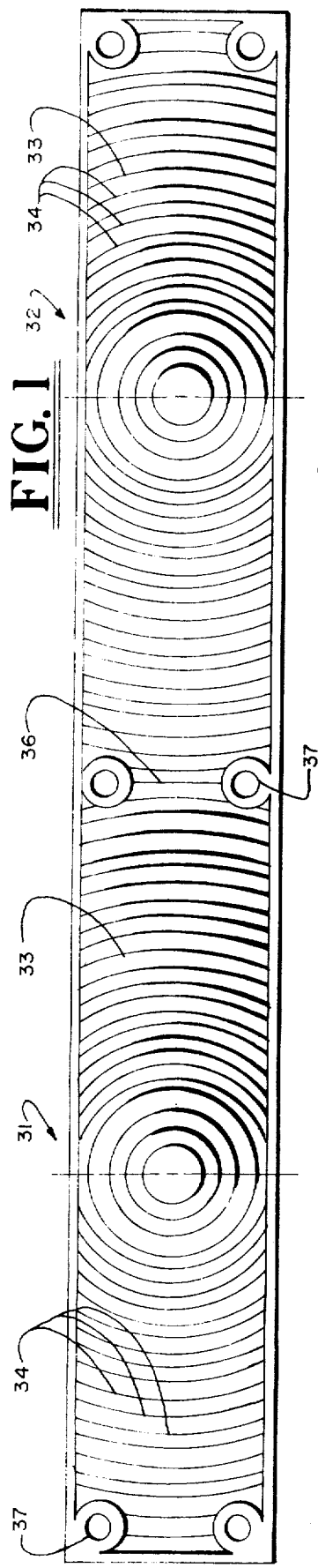
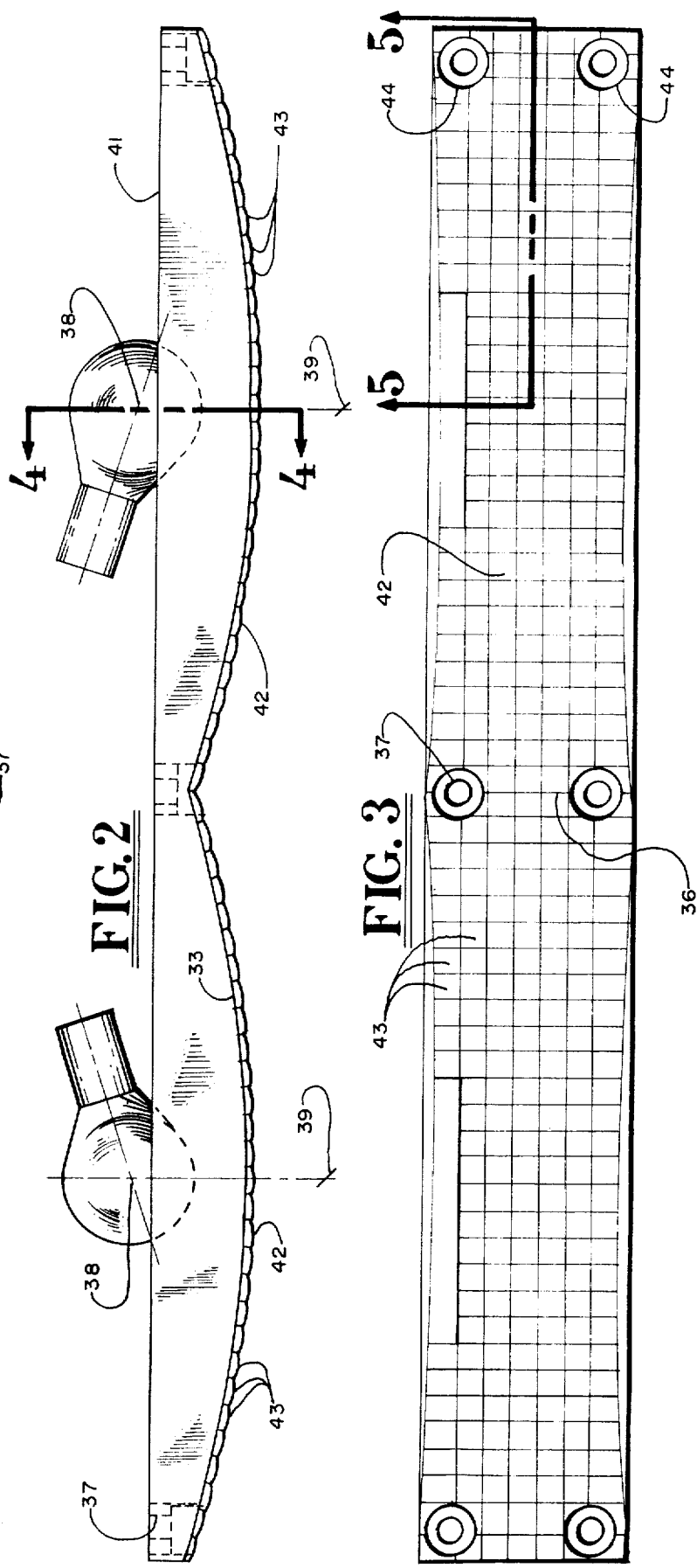

OPTICAL CONSTRUCTION OF A LENS

BACKGROUND OF THE INVENTION

This invention relates to a lens for concentrating the intensity of a light source located behind the lens along the centerline of the lens, and more particularly to such a lens which reduces the intensity of light transmitted in directions diverging from the centerline of the lens by predetermined amount.

Rear end automobile collisions are relatively common, especially in areas of high traffic density. It is generally felt that a warning means providing drivers approaching other automobiles from the rear with an indication of closing rate would greatly decrease the number of rear end collisions. Such a system should offer a warning primarily to those drivers immediately behind a slowing vehicle without bothering drivers who may safely pass to either side of the slowing vehicle. A light with a flashing rate exponentially proportional to rate of reduction of vehicle velocity is useful in such a system, but the light must be directed primarily to those drivers in whose path the slowing vehicle lies. A need exists, therefore, for a directional lens for use on the rear of automobiles for concentrating the majority of the light intensity directly rearward from automobiles using such a deceleration warning system.

SUMMARY AND OBJECTS OF THE INVENTION

The lens which provides directional transmission of light passed therethrough is a thin wall section of a spherical shell having a plurality of coterminous aspheric square convex lenses on the convex side thereof. The concave side has a plurality of concentric triangular lenses having dimensions as set forth in Table I. When a light source is positioned on the lens centerline on the concave side of the lens, the majority of the transmitted light is projected directly rearward, diminishing by approximately 50 percent for each five degree angular departure from the lens centerline.

In general it is an object of the invention to provide an optical lens for concentrating transmitted light along an extension of the lens centerline.

Another object of the invention is to provide an optical lens which may be placed adjacent similar lenses for projecting the majority of the light intensity from a plurality of light sources along the lens centerline in a common direction.

Additional objects and features of the invention will appear from the following description in which the preferred embodiment has been set forth in detail in conjunction with the accompanying drawings.

BRIEF DESCRIPTION OF THE DRAWINGS

FIG. 1 is a rear elevational view of the optical lens.

FIG. 2 is a plan view of the optical lens with light sources.

FIG. 3 is a front elevational view of the optical lens.

DESCRIPTION OF THE PREFERRED EMBODIMENT

Figure 5:
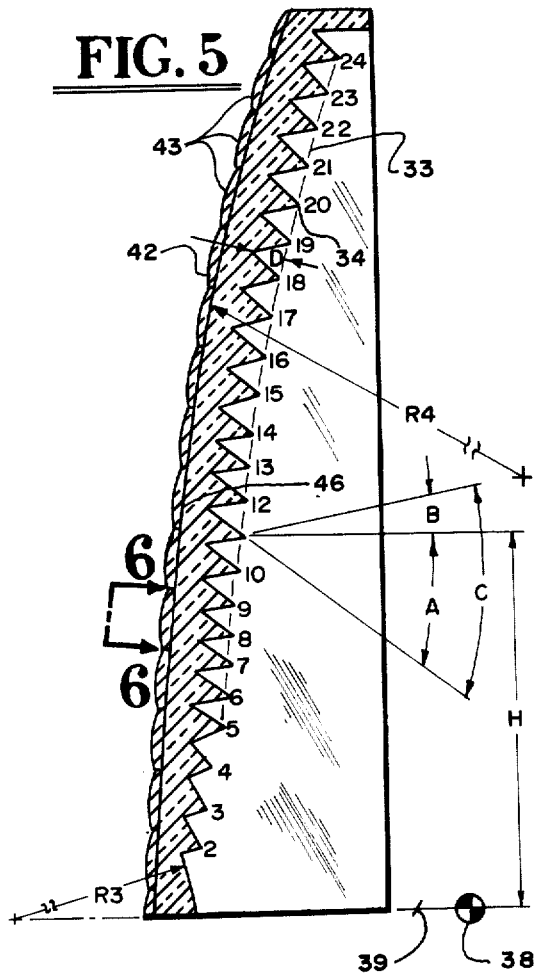
FIG. 5 is a sectional view along the line 5—5 of FIG. 3.

An optical lens is disclosed herein which projects the major portion of transmitted light from a light source situated on the lens centerline directly along an extension of the lens centerline. FIG. 1 shows the rear of the lens having similar left and right halves 31 and 32, respectively. Each lens half is a section of a thin wall spherical shell with a concave rear surface 33 having a series of substantially triangular cross section concentric lenses 34 formed thereon. The sections 31 and 32 are rectangular in shape in the plan view and are joined at one common end 36. Six through holes 37 for mounting are conveniently placed about the periphery of the joined lenses.

FIG. 2 shows lens halves 31 and 32 joined at common end 36 and a light source 38 situated on centerlines 39 of each of the lenses 31 and 32. The whole lens has a mounting base 41 toward the concave side 33. A convex side 42 of lens portions 31 and 32 has a plurality of aspheric convex lens segments 43 formed thereon. Aspheric lens segments 43 may be seen in FIG. 3. Convex surface 42 has six counterbores 44 formed therein, each one concentric with one of the through holes 37.

Figure 4:
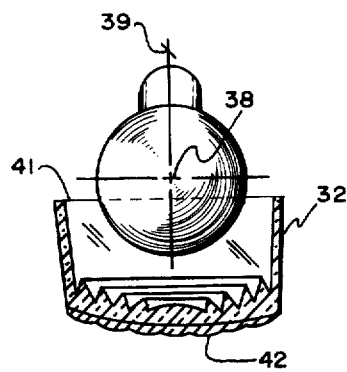
FIG. 4 is a side elevational view of the optical lens and a light source.

FIG. 4 shows the light source 38 on lens centerline 39 of lens half 32.

The triangular lenses 34 on the concave side 33 of lenses 31 and 32 may best be seen in FIG. 5. Lens centerline 39 is shown passing through light source 38 and lens 32. Lens 32 has a spherical radius R4 to a base curve 46. Concave side 33 has a central convex spherical portion with radius R3 designated by the number 1 in FIG. 5 and in Table I below. The remainder of the lenses on concave side 33 are triangular in cross section and concentric about centerline 39. The vertices of the triangular lenses 34 are at radii designated H having the angles A, B and C associated therewith for each triangular lens 2 through 24 as designated in Table I.

TABLE I

| No. | H | A | B | C | D |
|---|---|---|---|---|---|
| 1 | .000 | — | — | — | .051 |
| 2 | .220 | 63°30′ | 4° | 67°30′ | .062 |
| 3 | .346 | 57°30′ | 4° | 61°30′ | .080 |
| 4 | .478 | 54°30′ | 7° | ″ ″ | .086 |
| 5 | .620 | 30° | 10°30′ | 40°30′ | .125 |
| 6 | .716 | 31° | 9°30′ | ″ ″ | ″ |
| 7 | .811 | 32°30′ | 8° | ″ ″ | ″ |
| 8 | .907 | 34° | 6°30′ | ″ ″ | ″ |
| 9 | 1.002 | 35°30′ | 5° | ″ ″ | ″ |
| 10 | 1.120 | 35° | 12° | 47° | ″ |
| 11 | 1.232 | 36° | 11° | ″ | ″ |
| 12 | 1.344 | 37° | 10° | ″ | ″ |
| 13 | 1.456 | 38° | 9° | ″ | ″ |
| 14 | 1.568 | 39° | 8° | ″ | ″ |
| 15 | 1.700 | 38°30′ | 16° | 54° 30′ | ″ |
| 16 | 1.827 | 39°30′ | 15° | ″ | ″ |
| 17 | 1.955 | 40°30′ | 14° | ″ | ″ |
| 18 | 2.082 | 41° | 13°30′ | ″ | ″ |
| 19 | 2.209 | 41°30′ | 13° | ″ | ″ |
| 20 | 2.337 | 42°30′ | 12° | ″ | ″ |
| 21 | 2.463 | 43° | 11°30′ | ″ | ″ |
| 22 | 2.591 | 43°30′ | 11° | ″ | ″ |
| 23 | 2.718 | 44°30′ | 10° | ″ | ″ |
| 24 | 2.846 | 45°30′ | 9° | ″ | ″ |

Figure 6:
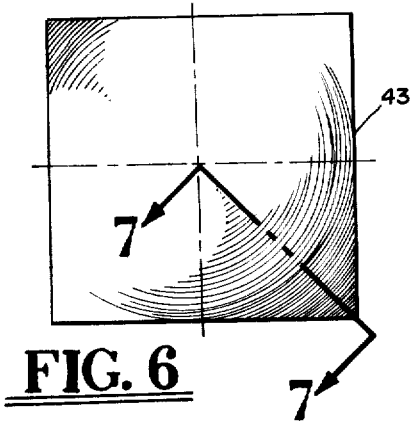
FIG. 6 is a detailed view along the line 6—6 of FIG. 5.
Figure 7:
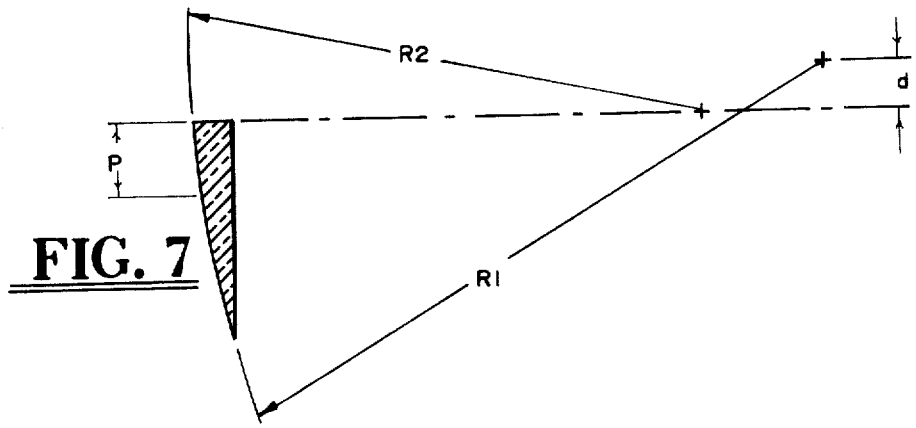
FIG. 7 is a sectional view along the line 7—7 of FIG. 6.

Concave side 42 has aspheric lenses 43 formed thereon which are best seen in FIGS. 6 and 7. Aspheric lenses 43 are square in shape in this embodiment. As seen in FIG. 7, a cross section of aspheric lens 43 has a spherical central radius R2 extending a distance P from the centerline of aspheric lens 43. A second spherical radius R1 extends from point P out to the corner point of each lens 43. Spherical radius R1 is offset from the centerline of lens 43 by the distance $d$.

The lenses disclosed herein may be mounted by means of mounting base 41 to the rear of an automobile carrying light sources 38 adjacent to the concave sides of the lenses. One embodiment having the triangular lens characteristics described in Table I and fabricated of a polycarbonate plastic with a refractive index of 1.586, provides for a light transmission characteristic through the lens decreasing in intensity by approximately 50 percent for each five degree angular departure from centerline 39. The above-mentioned lens has the following spherical radius dimensions:

R1=0.500 inches
R2=0.375 inches
R3=0.50 inches
R4=9.50 inches

P is 0.050 inches and $d$ is 0.017 inches. Aspheric lenses 43 are 0.200 inches square in this embodiment.

The lens disclosed herein is capable of performing with the limits shown in Table II with the test equipment calibrated for amber light and the photometer at a distance of approximately 100 feet from the test light source. The pair of light sources 38 are positioned just behind the concave surface 33 of lens 31 and 32 on centerline 39. A design mena spherical candlepower of 21 candles is produced for test purposes by each of the light sources 38. Table II shows maximum and minimum luminous intensity levels transmitted through lens 31 and 32 as measured at angular departures from centerline 39 indicated therein. The letters "L", "R", "U", and "D" in Table II designate the photometer position relative to the centerline 39 when convex surface 42 is facing the photometer.

TABLE II

| | Test points degrees | Minimum | Maximum |
|---|---|---|---|
| 10 U | 10L | 25 | 70 |
| | V | 60 | 200 |
| | 10R | 25 | 70 |
| | 20L | 15 | 40 |
| | 10L | 60 | 200 |
| | 5L | 200 | 600 |
| 5 U | V | 350 | 800 |
| | 5R | 200 | 600 |
| | 10R | 60 | 200 |
| | 20R | 15 | 40 |
| | 20L | 15 | 40 |
| | 10L | 60 | 200 |
| | 5L | 350 | 800 |
| H | V | 600 | 1,300 |
| | 5R | 350 | 800 |
| | 10R | 60 | 200 |
| | 20R | 15 | 40 |
| | 20L | 15 | 40 |
| | 10L | 60 | 200 |
| | 5L | 200 | 600 |
| 5 D | V | 350 | 800 |
| | 5R | 200 | 600 |
| | 10R | 60 | 200 |
| | 20R | 15 | 40 |
| | 10L | 25 | 70 |
| 10 D | V | 60 | 200 |
| | 10R | 25 | 70 |

It is apparent from the foregoing disclosure that the design of an optical lens has been presented which concentrates the majority of the light intensity transmitted therethrough along the lens centerline, inhibiting dispersal of high intensity light to either side or above or below the lens centerline.

I claim:

1. An optical lens comprising at least one thin wall section of a spherical shell, a plurality of similar coterminous aspheric convex lenses on the convex side of said shell, a plurality of concentric lenses having triangular cross sections on the concave side of said shell having vertices at radii H describing an angle C as given in the following table where angles A and B and the dimension D are as indicated by reference to the accompanying drawings:

TABLE I

| No. | H | A | B | C | D |
|---|---|---|---|---|---|
| 1 | .000 | — | — | — | .051 |
| 2 | .220 | 63°304 | 4° | 67°30' | .062 |
| 3 | .346 | 57°30' | 4° | 61°30' | .080 |
| 4 | .478 | 54°30' | 7° | " " | .086 |
| 5 | .620 | 30° | 10°30' | 40°30' | .125 |
| 6 | .716 | 31° | 9°30' | " " | " |
| 7 | .811 | 32°30' | 8° | " " | " |
| 8 | .907 | 34° | 6°30' | " " | " |
| 9 | 1.002 | 35°30' | 5° | " " | " |
| 10 | 1.120 | 35° | 12° | 47° | " |
| 11 | 1.232 | 36° | 11° | " " | " |
| 12 | 1.344 | 37° | 10° | " | " |
| 13 | 1.456 | 38° | 9° | " | " |
| 14 | 1.568 | 39° | 8° | " | " |
| 15 | 1.700 | 38°30' | 16° | 54°30' | " |
| 16 | 1.827 | 39°30' | 15° | " | " |
| 17 | 1.955 | 40°30' | 14° | " | " |
| 18 | 2.082 | 41° | 13°30' | " | " |
| 19 | 2.209 | 41°30' | 13° | " | " |
| 20 | 2.337 | 42°30' | 12° | " | " |
| 21 | 2.463 | 43° | 11°30' | " | " |
| 22 | 2.591 | 43°30' | 11° | " | " |
| 23 | 2.718 | 44°30' | 10° | " | " |
| 24 | 2.846 | 45°30' | 9° | " | ". |

2. An optical lens as in claim 1 comprising a pair of said thin wall shell sections attached at one edge of said sections with the convex surfaces facing the same direction, and the radii of curvature of said shell sections parallel, whereby when a light source is positioned on the concave side on the centerline of each of said shell sections, light intensity diminishes by approximately 50 percent for each 5° departure from the centerline.

3. An optical lens as in claim 1 wherein said aspheric lenses have a 0.375 inch spherical radius to a distance of 0.050 inches from the center of each lens, a 0.500 inch spherical radius over the remainder of the lens, and are 0.200 by 0.200 inches square.

4. An optical lens comprising at least one thin wall section of a spherical shell having a predetermined lens centerline, a plurality of aspheric convex lenses on the convex side of said shell, and a plurality of concentric lenses having triangular cross sections on the concave side of said shell, whereby luminous intensity transmission of light therethrough from a light source of 21 mean spherical candlepower adjacent the concave side of each of said spherical shells and on said centerline thereof, is within the candlepower ranges in the following table at angular departures from said lens centerline indicated therein

TABLE II

| | Test points degrees | Minimum | Maximum |
|---|---|---|---|
| 10U | 10L | 25 | 70 |
| | V | 60 | 200 |
| | 10R | 25 | 70 |
| | 20L | 15 | 40 |

TABLE II-Continued

| | Test points degrees | Minimum | Maximum |
|---|---|---|---|
| | 10L | 60 | 200 |
| | 5L | 200 | 600 |
| 5U | V | 350 | 800 |
| | 5R | 200 | 600 |
| | 10R | 60 | 200 |
| | 20R | 15 | 40 |
| | 20L | 15 | 40 |
| | 10L | 60 | 200 |
| | 5L | 350 | 800 |
| H | V | 600 | 1,300 |
| | 5R | 350 | 800 |
| | 10R | 60 | 200 |
| | 20R | 15 | 40 |
| | 20L | 15 | 40 |
| | 10L | 60 | 200 |
| | 5L | 200 | 600 |
| 5D | V | 350 | 800 |
| | 5R | 200 | 600 |
| | 10R | 60 | 200 |
| | 20R | 15 | 40 |
| | 10L | 25 | 70 |
| 10D | V | 60 | 200 |
| | 10R | 25 | 70 |

\* \* \* \* \*